United States Patent
Wiedeman et al.

(10) Patent No.: US 7,142,853 B2
(45) Date of Patent: Nov. 28, 2006

(54) LOW PERFORMANCE WARNING SYSTEM AND METHOD FOR MOBILE SATELLITE SERVICE USER TERMINALS

(75) Inventors: Robert A. Wiedeman, Sedalia, CO (US); Prashant V. Waknis, Mountain View, CA (US)

(73) Assignee: Globalstar, Inc., Milpitas, CA (US)

( * ) Notice: Subject to any disclaimer, the term of this patent is extended or adjusted under 35 U.S.C. 154(b) by 1133 days.

(21) Appl. No.: 09/846,995

(22) Filed: May 1, 2001

(65) Prior Publication Data

US 2002/0032002 A1    Mar. 14, 2002

Related U.S. Application Data

(60) Provisional application No. 60/201,112, filed on May 2, 2000.

(51) Int. Cl.
*H04Q 7/20* (2006.01)

(52) U.S. Cl. .................. 455/427; 455/428; 455/429; 455/421

(58) Field of Classification Search ............... 455/427, 455/428, 429, 430, 421
See application file for complete search history.

(56) References Cited

U.S. PATENT DOCUMENTS

| | | | | |
|---|---|---|---|---|
| 5,490,087 A | * | 2/1996 | Redden et al. | 455/427 |
| 5,918,176 A | * | 6/1999 | Arrington et al. | 455/430 |
| 5,930,718 A | * | 7/1999 | Rydbeck et al. | 455/458 |
| 6,070,073 A | * | 5/2000 | Maveddat et al. | 455/428 |

* cited by examiner

*Primary Examiner*—Edan Orgad
(74) *Attorney, Agent, or Firm*—Karambelas & Associates

(57) ABSTRACT

A mobile satellite telecommunications system is disclosed comprising at least a user terminal and a satellite which is in earth orbit and at least a gateway bidirectionally coupled to a data communications network. The user terminal comprises a controller responsive to at least one criterion having been met for activating an indicator to inform a user of a potential for reduced user terminal performance.

20 Claims, 2 Drawing Sheets

LOW PERFORMANCE WARNING SYSTEM AND METHOD FOR MOBILE SATELLITE SERVICE USER TERMINALS

CLAIM OF PRIORITY FROM COPENDING PROVISIONAL PATENT APPLICATION

This application claims priority under 35 U.S.C. 119(e) and 120 from provisional patent application No. 60/201,112, filed on May 2, 2000, the disclosure of which is incorporated by reference herein in its entirety.

FIELD OF THE INVENTION

These teachings relate generally to satellite-based communication systems and, more particularly, relate to non-geosynchronous orbit satellite communication systems, such as Low Earth Orbit (LEO) and Medium Earth Orbit (MEO) satellite communication systems.

BACKGROUND OF THE INVENTION

Mobile Satellite Service User Terminals (UTs) are designed to provide voice, data and other services in a Mobile Satellite Telecommunications System (MSTS). A MSTS typically uses non-geosynchronous orbit (non-GEO) satellites, such as Low Earth Orbit (LEO) satellites, to couple signals between a ground station or gateway and a plurality of UTs. The MSTS may operate over multiple satellites at a time to provide path diversity to the UTs. The path diversity can be provided on the forward link (gateway to UT), on the return link (UT to gateway), or on both links. In general, the forward link path is power limited, and the return link path is link limited.

In MSTS systems the propagation to the UT is enhanced when path diversity is present. However, a given UT may not always experience path diversity due to blocking and shadowing effects, or due to non-uniformities in satellite constellation coverage. When the path diversity is not present, for whatever reason, the UT may find itself in a propagation environment that is sensitive to blockage, and a voice or a data call can become impaired or even dropped (i.e., abruptly terminated by the system, not the user). Unfortunately, in such a situation the user may have no idea as to why the call was impaired or dropped, or how to remedy the situation.

As such, a need exists to enable some degree of UT selectivity, control and autonomy over the operational modes and other aspects of the communications of the UT during data transfer and other types of communication operations.

SUMMARY OF THE INVENTION

The foregoing and other problems are overcome by methods and apparatus in accordance with embodiments of these teachings.

A method is disclosed for operating a mobile satellite telecommunications (MSTS) system, as is a system that operates in accordance with the method. In a MSTS having at least one user terminal, at least one satellite in earth orbit, and at least one gateway bidirectionally coupled to a data communications network, in response to a determination that at least one criterion being met, an indicator of the user terminal is activated for informing a user of a potential for reduced user terminal performance. The least one criterion can include the number of satellites through which a communication between the user terminal and the gateway is conducted, such as an occurrence of there being only one satellite through which the communication between the user terminal and the gateway is conducted, or a prediction of an occurrence that there will be only one satellite through which the communication between the user terminal and the gateway will be conducted. The criteria can further include an occurrence of an elevation angle between the one satellite and the user terminal falling below a minimum threshold value and/or an occurrence of a signal strength or signal quality of a link between the one satellite and the user terminal falling below a minimum threshold value. The user terminal is preferably responsive to received pilot channel signals for detecting a number of satellites through which a communication between the user terminal and the gateway is conducted. The indicator is preferably at least one of a visual indicator, a tactile indicator or an audible indicator. In one embodiment the determination that the at least one criterion has been met is made in the user terminal, while in another embodiment the determination is made in the gateway, preferably based at least in part on information transmitted to the gateway from the user terminal.

BRIEF DESCRIPTION OF THE DRAWINGS

The above set forth and other features of these teachings are made more apparent in the ensuing Detailed Description of the Preferred Embodiments when read in conjunction with the attached Drawings, wherein.

DETAILED DESCRIPTION OF THE PREFERRED EMBODIMENTS

Figure 1:
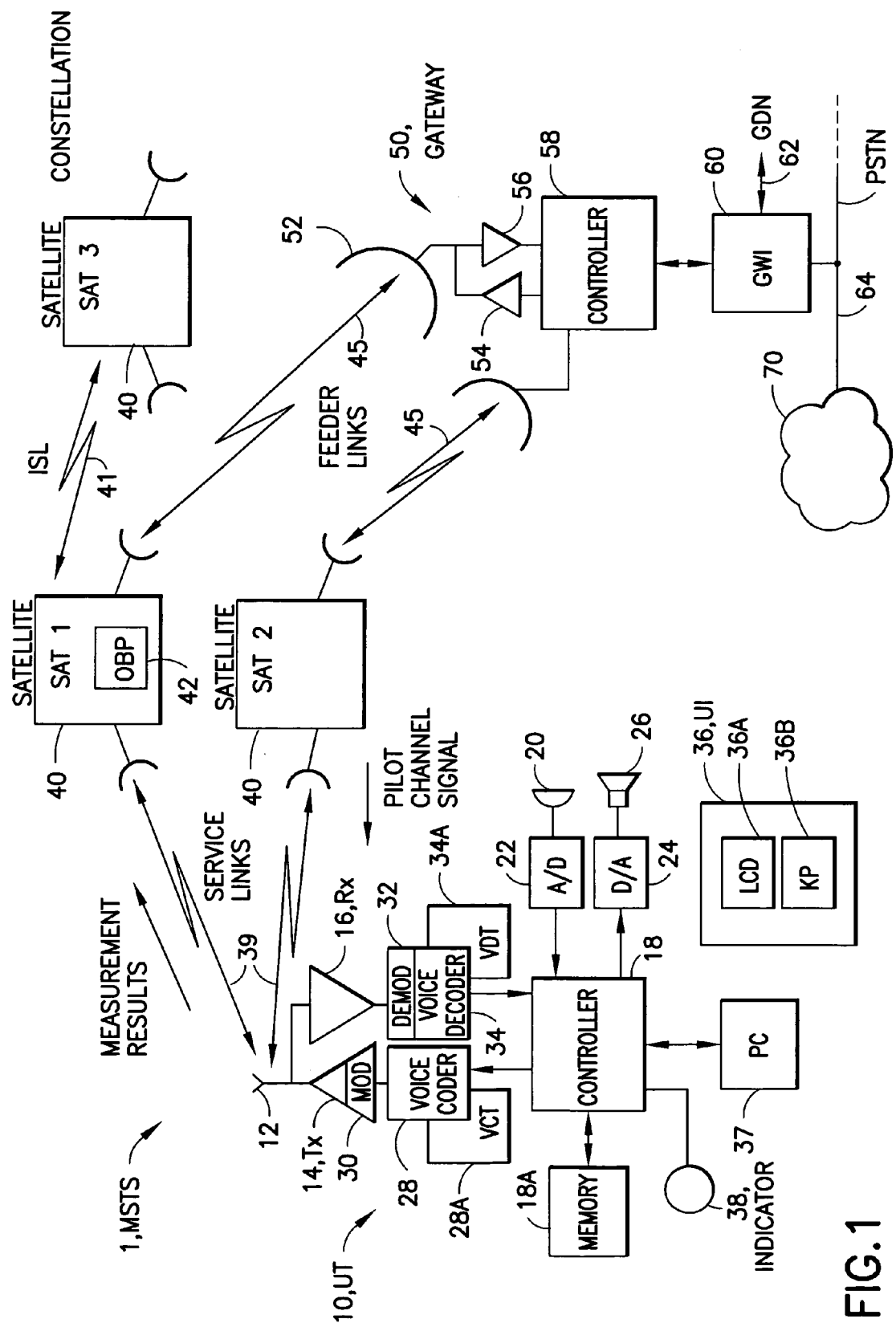
FIG. 1 is a simplified block diagram of a mobile satellite telecommunications system (MSTS) that is suitable for practicing these teachings.
Figure 2:
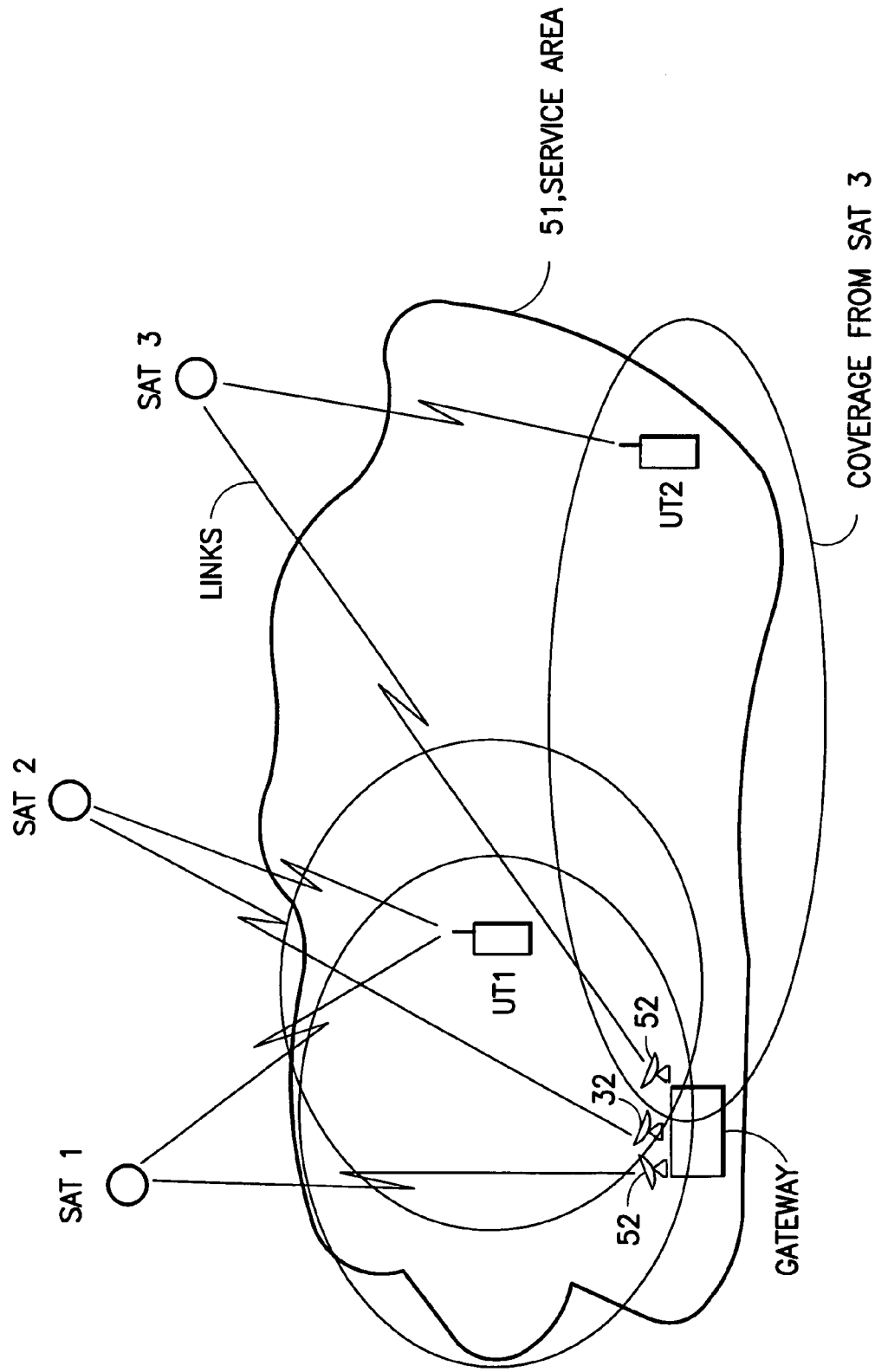
FIG. 2 is a diagram showing various links between a plurality of user terminals (UT1, UT2) and a gateway made through a plurality of satellites (SAT1, SAT2, SAT3).

Reference is made to FIGS. 1 and 2 for illustrating a simplified block diagram of a digital wireless telecommunications system, embodied herein as a mobile satellite telecommunications system (MSTS) 1, that is suitable for practicing these teachings. While described in the context of the MSTS 1, those skilled in the art should appreciate that certain of these teachings may have application to terrestrial telecommunications systems as well.

The MSTS 1 includes at least one, but typically many, wireless user terminals (UTs) 10, at least one, but typically several, communications satellite 40, and at least one, but typically several, communications ground stations or gateways 50. Each gateway 50 has an associated service area 51. In FIG. 1 three satellites are shown for convenience, with one being designated satellite 40A, one satellite 40B and one satellite 40C, hereafter collectively referred to as satellite or satellites 40 (referred to in FIG. 2 as SAT1, SAT2 and SAT3, respectively.) The satellites 40 may contain an on-board processor (OBP) 42, wherein a received transmission is at least partially demodulated to baseband, processed on the satellite 40, re-modulated and then transmitted. Inter-Satellite Links (ISLs) 41 may exist between satellites 40A, 40B and 40C. The ISL could be implemented using an RF link or an optical link and, if used, is modulated with information that is transferred between the satellites 40.

Reference with regard to satellite-based communications systems can be had, by example, to U.S. Pat. No. 5,526,404, "Worldwide Satellite Telephone System and a Network Coordinating Gateway for Allocating Satellite and Terrestrial Resources", by Robert A. Wiedeman and Paul A. Monte; to U.S. Pat. No. 5,303,286, "Wireless Telephone/Satellite Roaming System", by Robert A. Wiedeman; to U.S. Pat. No. 5,619,525, "Closed Loop Power Control for Low Earth Orbit Satellite Communications System", by Robert A. Wiedeman and Michael J. Sites; and to U.S. Pat. No. 5,896,558 "Interactive Fixed and Mobile Satellite Network", by Robert A. Wiedeman, for teaching various embodiments of satellite communications systems, such as low earth orbit (LEO) satellite systems, that can benefit from these teachings. The disclosures of these various U.S. Patents are incorporated by reference herein in their entireties, in so far as they do not conflict with the teachings of this invention.

The exemplary UT 10 includes at least one antenna 12, such as an omni-directional antenna or a directional antenna, for transmitting and receiving RF signals over service links 39, and further includes an RF transmitter (TX) 14 and an RF receiver (RX) 16 having an output and an input, respectively, coupled to the antenna 12. A controller 18, which may include one or more microprocessors and associated memories 18a and support circuits, functions to control the overall operation of the UT 10. An input speech transducer, typically a microphone 20, may be provided to input a user's speech signals to the controller 18 through a suitable analog to digital (A/D) converter 22. An output speech transducer, typically including a loudspeaker 26, may be provided to output received speech signals from the controller 18, via a suitable digital to analog (D/A) converter 24. The UT 10 may also include some type of user interface (UI) 36 that is coupled to the controller 18. The UI 36 can include a display 36A and a keypad 36B. The UT 10 may also be coupled with a computing device, such as a laptop computer or a PC 37, and may thus function as a wireless modem for the PC 37.

A transmit path may include a desired type of voice coder (vocoder) 28 that receives a digital representation of the input speech signals from the controller 18, and includes voice coder tables (VCT) 28a and other required support circuitry, as is well known in the art. The output of the vocoder 28, which is a lower bit rate representation of the input digital speech signals or samples, is provided to a RF modulator (MOD) 30 for modulating a RF carrier, and the modulated RF carrier is upconverted to the transmission frequency and applied to the input to the RF transmitter amplifier 14. Signaling information to be transmitted from the UT 10 is output from the controller 18 to a signaling path that bypasses the vocoder 28 for application directly to the modulator 30. Not shown or further discussed is the framing of the transmitted signal for a TDMA type system, or the spreading of the transmitted signal for a CDMA type system, since these operations are not germane to an understanding of this invention. Other operations can also be performed on the transmitted signal, such as Doppler precorrection, interleaving and other well known operations.

A receive path may include the corresponding type of voice decoder 34 that receives a digital representation of a received speech signal from a corresponding type of demodulator (DEMOD) 32. The voice decoder 34 includes voice decoder tables (VDT) 34a and other required support circuitry, also as is well known in the art. The output of the voice decoder 34 is provided to the controller 18 for audio processing, and is thence sent to the D/A converter 24 and the loudspeaker 26 for producing an audible voice signal for the user. As with the transmitter path, other operations can be performed on the received signal, such as Doppler correction, de-interleaving, and other well known operations. In a manner analogous to the transmit path, received signaling information is input to the controller 18 from a signaling path that bypasses the voice decoder 34 from the demodulator 32.

It is pointed out that the above-mentioned voice and audio capability is not required to practice these teachings, as the UT 10 may operate solely as a data communications device. In this mode of operation the vocoder(s) may simply be bypassed, and the data signals modulated/demodulated, interleaved/de-interleaved, etc. In a data-only application the UT 10 may be constructed so as not to include any analog voice capability at all. Furthermore, in a data-only application the user interface 36 may not be required, particularly if the UT 10 is wholly or partially embedded within another device, such as the PC 37.

The RF signals transmitted from the UT 10 and those received by the UT 10 over the service links 39 pass through at least one satellite 40, which may be in any suitable altitude and orbital configuration (e.g., circular, elliptical, equatorial, polar, etc.) In the preferred embodiment the satellite 40 is one of a constellation of non-geosynchronous orbit (non-GEO) satellites, preferably Low Earth Orbit (LEO) satellites, although one or more Medium Earth Orbit (MEO) satellites could be used as well, as could one or more geosynchronous orbit satellites in conjunction with LEO or MEO satellites.

The satellite 40 serves to bidirectionally couple the UT 10 to the gateway 50. The gateway 50 includes a plurality of suitable RF antennas 52, such as steerable parabolic antenna, for transmitting and receiving a feederlink 45 with the satellite 40. The feederlink 45 will typically include communication signals for a number of UTs 10. The gateway 50 further includes a transceiver, comprised of transmitters 54 and receivers 56, and a gateway controller 58 that is bidirectionally coupled to a gateway interface (GWI) 60. The GWI 60 provides connections to a Ground Data Network (GDN) 62 through which the gateway 50 communicates with a ground operations control center (not shown) and possibly other gateways. The GWI 60 also provides connections to one or more terrestrial telephone and data communications networks 64, such as the Public Switched Telephone Network (PSTN), Public Land Mobile Network (PLMN) and/or the Public data Network (PDN), whereby the UT 10 can be connected to any wired or wireless telephone, or to another UT, through the terrestrial telecommunications network. In accordance with an aspect of these teachings the gateway 50 provides an ability to reach the Internet 70, which provides access to various servers. The gateway 50 also includes banks of modulators, demodulators, voice coders and decoders, as well as other well known types of equipment, which are not shown to simplify the drawing.

Having thus described one suitable but not limiting embodiment of a mobile satellite telecommunications system that can be used to practice these teachings, a description of the preferred embodiments of these teachings will now be provided.

When the UT 10 begins to become impaired by loss of path diversity a warning is delivered to the user with some indicator, shown generically as indicator 38, which may be a visual indicator, a tactile indicator using vibration or some other mechanical means, an audible indicator, or a combination of these various types of indicators. The LCD 36A could be used to deliver a visual indicator, or a separate indicator light or LED could be used. If embodied as an audible indicator, then speech synthesis techniques can be used annunciate a message to the user.

The indicator 38 may be considered to signal to the user or to warn the user that a potential exists for experiencing low or reduced user terminal performance, e.g., a potential exists to drop a call based on current and/or predicted satellite availability and/or elevation angle, and/or because of signal strength or signal quality conditions.

There are at least two techniques to provide the delivery of the of the warning indicator 38. A first technique uses information received on the forward link from the gateway (GW) 50. The received information is used by the UT 10 to make its own determination of when to activate the warning indicator 38. Alternatively, the GW 50 can calculate when the UT 10 should activate the warning indicator 38, and transmit this information to the UT 10.

The first technique, also referred to herein as UT 10 autonomous warning delivery without GW 50 intervention, is now described in further detail.

In an exemplary MSTS 1, known as Globalstar™, a CDMA signal is received by the UT 10, the delivery of which, under normal conditions, is via at least two satellites 40 (satellite path diversity). When two satellites 40 are visible the signal power delivered to the UT 10 can be divided by the GW 50 between the two satellites. The UT 10 receives GW-originated pilot signals from each satellite 40, and in fact may be receiving pilot signals through other satellites as well. Periodically, the UT 10 informs the GW 50 of the pilot signals that it is receiving, along with their signal strengths. Since the UT 10 knows what pilot signals it is receiving, and the satellites 40 that the pilot signals are transmitted through, it is possible for the UT 10 to determine when only one satellite 40 is available. This information may be used as a simple "on-off" switch, using the indicator 38, to notify the user when only one satellite is available and, thus, that the possibility exits to experience propagation impairments or dropped calls.

This current satellite availability information may be enhanced with other information stored in the UT 10, or periodically transmitted to the UT 10, and that provides data by which the UT 10 can calculate the elevation angle to the satellite(s) 40. In this manner the UT 10 may calculate the elevation angle to the last remaining satellite 40, and then only issue the warning when the elevation angle drops below some threshold value (e.g., a value in the range of about 10 degrees to about 15 degrees). The UT 10 may also predict when the elevation angle to a given satellite 40 will drop below the threshold, and thus may activate the indicator 38 earlier so as to give the user advance warning of the potential for path impairments and dropped calls.

In a further embodiment, the UT 10 uses the energy in a received CDMA chip and divides this energy by the noise to derive an Ec/No value, or some other suitable received signal strength metric (or a received signal quality metric, such as the bit or symbol error rate). In this enhancement, the received signal strength or quality metric, e.g., the Ec/No value, is used to determine a threshold where the UT 10 begins to experience increasing difficulty in reception of the signal, and may be used in conjunction with one or both of the elevation angle-related embodiments discussed above.

Operation of the above described UT 10 autonomous warning system is as follows. Assume that UT 10 operates in accordance with the improvements discussed above, and that the UT 10 begins operation in the clear with at least two satellites 40 providing service. In this case the user is most likely unaware of the position of the moving satellites 40. After a period of time one of the satellites 40 moves behind a structure or a tree, which leaves only one satellite in view of the UT antenna 12. In a simple example, the pilot signal from the obstructed satellite 40 is no longer received by the UT 10 and the controller 18 forms a message which can be used to activate the indicator 38, such as by visually displaying a warning message to the user, or by using a tone or a tactile signal to warn the user.

In this case, the lack of satellites 40 may be normal, e.g., due to a non-full constellation or for some other reason, and therefore operation with only one satellite may at times be the norm, and not the exception. In this case it is preferred to provide a mechanism to limit or suppress the activation of the low performance indicator 38. In the preferred embodiment, before the warning indicator 38 is activated the UT 10 uses a stored database of information, or uses GW-provided information, to calculate its elevation angle to the single satellite 40 through which it is currently receiving service. If this elevation angle is below a pre-determined threshold, only then is the warning indicator 38 activated.

It should be noted that under some circumstances, e.g., depending on the orbital configuration of the satellite constellation, a low elevation angle, single satellite condition may exist under normal conditions. In order to avoid the issuance of an excessive number of warnings indications to the user, the signal strength enhancement discussed above may be used to allow the UT 10 to minimize the number of activations of the warning indicator 38. In this case, and after detecting the single satellite 40 condition, the UT 10 calculates the elevation angle of the single satellite 40, and then when the signal strength or the signal quality, e.g., when the measured Ec/No, drops below a pre-determined threshold the warning indicator 38 is activated.

The second technique, also referred to herein as a gateway 50 directed warning system, is now described in further detail. It can be appreciated that the GW 50 is also cognizant of the performance of the UT 10. For example, periodically the UT 10 informs the GW 50 as to the number of pilot signals that are available to the UT 10. The GW 50 knows the position or location of the UT 10, as it preferably performs a position location of the UT 10 at least during call setup. The GW 50 also has knowledge of the pilot channels being received by the UT 10, and the received signal strengths of these pilot channels, based at least one information transmitted to the GW 50 from the UT 10. Therefore, the GW 50 is enabled to perform the above calculations, such as satellite elevation angle calculations, and then send a message to the UT 10 which directs the UT 10 to activate (or de-activate) the low performance warning indicator 38, as discussed above. In this embodiment the computational load and memory requirements of the UT 10 can be relaxed, as the satellite ephemeris data need not be stored in the UT 10 for the purposes of generating the low performance warning, and the elevation angle calculations can be off-loaded to the typically more powerful data processor of the gateway controller 58.

While these teachings have been particularly shown and described with respect to preferred embodiments thereof, it will be understood by those skilled in the art that changes in form and details may be made therein without departing from the scope and spirit of these teachings.

What is claimed is:

1. A mobile satellite telecommunications system, comprising:
    at least one user terminal, at least one satellite in earth orbit; and
    at least one gateway bidirectionally coupled to a data communications network;
    said user terminal comprising a controller responsive to at least one criterion having been met for activating an indicator for informing a user of a potential for reduced user terminal performance, wherein said at least one criterion is comprised of an occurrence of there being only one satellite through which a communication between the user terminal and the gateway is conducted.

2. A mobile satellite telecommunications system, comprising:
at least one user terminal, at least one satellite in earth orbit; and
at least one gateway bidirectionally coupled to a data communications network;
said user terminal comprising a controller responsive to at least one criterion having been met for activating an indicator for informing a user of a potential for reduced user terminal performance, wherein said at least one criterion is comprised of a prediction of an occurrence of there being only one satellite through which a communication between the user terminal and the gateway is conducted.

3. A mobile satellite telecommunications system, comprising:
at least one user terminal, at least one satellite in earth orbit; and
at least one gateway bidirectionally coupled to a data communications network;
said user terminal comprising a controller responsive to at least one criterion having been met for activating an indicator for informing a user of a potential for reduced user terminal performance, wherein said at least one criterion is comprised of an occurrence of there being only one satellite through which a communication between the user terminal and the gateway is conducted, and a further occurrence of an elevation angle between said one satellite and said user terminal falling below a minimum threshold value.

4. A mobile satellite telecommunications system, comprising:
at least one user terminal, at least one satellite in earth orbit; and
at least one gateway bidirectionally coupled to a data communications network;
said user terminal comprising a controller responsive to at least one criterion having been met for activating an indicator for informing a user of a potential for reduced user terminal performance, wherein said at least one criterion is comprised of an occurrence of there being only one satellite through which a communication between the user terminal and the gateway is conducted, and a further occurrence of a signal strength or a signal quality of a link between said one satellite and said user terminal falling below a minimum threshold value.

5. A mobile satellite telecommunications system, comprising:
at least one user terminal;
at least one satellite in earth orbit; and
at least one gateway bidirectionally coupled to a data communications network;
said user terminal comprising a controller responsive to at least one criterion having been met for activating an indicator for informing a user of a potential for reduced user terminal performance, wherein said user terminal is responsive to received pilot channel signals for detecting a number of satellites through which a communication between the user terminal and the gateway is conducted.

6. A mobile satellite telecommunications system, comprising:
at least one user terminal;
at least one satellite in earth orbit; and
at least one gateway bidirectionally coupled to a data communications network;
said user terminal comprising a controller responsive to a receipt of a message from said gateway, indicating that at least one criterion has been met, for activating an indicator for informing a user of a potential for reduced user terminal performance, wherein said at least one criterion is comprised of an occurrence of there being only one satellite through which a communication between the user terminal and the gateway is conducted.

7. A mobile satellite telecommunications system as in claim 6, wherein said at least one criterion is comprised of a prediction of an occurrence of there being only one satellite through which a communication between the user terminal and the gateway is conducted.

8. A mobile satellite telecommunications system as in claim 6, wherein said at least one criterion is comprised of an occurrence of there being only one satellite through which a communication between the user terminal and the gateway is conducted, and a further occurrence of an elevation angle between said one satellite and said user terminal falling below a minimum threshold value.

9. A mobile satellite telecommunications system as in claim 6, wherein said at least one criterion is comprised of an occurrence of there being only one satellite through which a communication between the user terminal and the gateway is conducted, and a further occurrence of a signal strength or a signal quality of a link between said one satellite and said user terminal falling below a minimum threshold value.

10. A mobile satellite telecommunications system as in claim 6, wherein said user terminal is responsive to received pilot channel signals for detecting a number of satellites through which a communication between the user terminal and the gateway is conducted, and for transmitting information indicative of the number of satellites to said gateway.

11. A method for operating a mobile satellite telecommunications system, comprising:
providing at least one user terminal, at least one satellite in earth orbit, and at least one gateway bidirectionally coupled to a data communications network;
determining that at least one criterion has been met, wherein said at least one criterion is comprised of an occurrence of there being only one satellite through which a communication between the user terminal and the gateway is conducted; and
activating an indicator of said user terminal for informing a user of a potential for reduced user terminal performance.

12. A method as in claim 11, wherein said at least one criterion is comprised of a prediction of an occurrence of there being only one satellite through which a communication between the user terminal and the gateway is conducted.

13. A method as in claim 11, wherein said at least one criterion is comprised of an occurrence of there being only one satellite through which a communication between the user terminal and the gateway is conducted, and a further occurrence of an elevation angle between said one satellite and said user terminal falling below a minimum threshold value.

14. A method as in claim 11, wherein said at least one criterion is comprised of an occurrence of there being only one satellite through which a communication between the user terminal and the gateway is conducted, and a further occurrence of a signal strength or a signal quality of a link between said one satellite and said user terminal falling below a minimum threshold value.

15. A method as in claim 11, wherein said user terminal is responsive to received pilot channel signals for detecting a number of satellites through which a communication between the user terminal and the gateway is conducted.

16. A method as in claim 11, wherein said determination is made in said user terminal.

17. A method as in claim 11, wherein said determination is made in said gateway based at least in part on information transmitted to said gateway from said user terminal.

18. A mobile satellite telecommunications system comprising:
   at least one user terminal;
   at least one satellite in earth orbit; and
   at least one gateway bidirectionally coupled to a data communications network;
   said user terminal comprising a controller responsive to at least one criterion having been met for activating an indicator for informing a user of a potential for reduced user terminal performance;
   said at least one criterion being comprised of an occurrence of there being only one satellite through which a communication between the user terminal and the gateway is conducted, a further occurrence of an elevation angle between said one satellite and said user terminal falling below a minimum threshold value and a further occurrence of a signal strength or a signal quality of a link between said one satellite and said user terminal falling below a minimum threshold of value.

19. A mobile satellite telecommunications system comprising:
   at least one user terminal;
   at least one satellite in earth orbit; and
   at least one gateway bidirectionally coupled to a data communications network;
   said user terminal comprising a controller responsive to a receipt of a message from said gateway, indicating that at least one criterion has been met, for activating an indicator for informing a user of a potential for reduced user terminal performance,
   wherein said at least one criterion is comprised of an occurrence of there being only one satellite through which a communication between the user terminal and the gateway is conducted, a further occurrence of an elevation angle between said one satellite and said user terminal falling below a minimum threshold value, and a further occurrence of a signal strength or a signal quality of a link between said one satellite and said user terminal falling below a minimum threshold value.

20. A method for operating a mobile satellite telecommunications system comprising:
   providing at least one user terminal;
   at least one satellite in earth orbit; and
   at least one gateway bidirectionally coupled to a data communications network;
   determining the at least one criterion has been met; and
   activating an indicator of said user terminal for informing a user of a potential for reduced user terminal performance,
   wherein said at least one criterion is comprised of an occurrence of there being only one satellite through which a communication between the user terminal and the gateway is conducted, a further occurrence of an elevation angle between said one satellite and said user terminal falling below a minimum threshold value, and a further occurrence of a signal strength or a signal quality of a link between said one satellite and said user terminal falling below a minimum threshold value.

* * * * *